(12) United States Patent
Wellnhofer et al.

(10) Patent No.: US 6,718,253 B1
(45) Date of Patent: Apr. 6, 2004

(54) METHOD FOR FORMING AN ACTUATING VARIABLE

(75) Inventors: Helmut Wellnhofer, Bad Abbach (DE); Reinhold Dirnberger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 1,826 days.

(21) Appl. No.: 08/235,668

(22) Filed: Apr. 29, 1994

(30) Foreign Application Priority Data

Apr. 29, 1993 (EP) .............................. 93107008

(51) Int. Cl.$^7$ .............................................. G05B 13/02
(52) U.S. Cl. ........................... 701/108; 703/2; 708/290; 123/681; 123/480
(58) Field of Search ........................ 364/431.03, 431.11, 364/431.06, 723; 123/480, 486, 417, 492, 681; 703/2; 701/108, 106, 114; 708/290; 700/33, 48, 50, 28

(56) References Cited

U.S. PATENT DOCUMENTS

| | | | |
|---|---|---|---|
| 3,835,819 A | * | 9/1974 | Anderson, Jr. .......... 123/32 EA |
| 3,893,432 A | * | 7/1975 | Krupp et al. ........... 123/32 EA |
| 3,904,856 A | * | 9/1975 | Monpetit ............... 235/150.21 |
| 3,906,207 A | * | 9/1975 | Rivere et al. ............ 235/150.2 |
| 4,099,495 A | * | 7/1978 | Kiencke et al. ......... 123/32 EA |
| 4,255,789 A | | 3/1981 | Hartford et al. ............. 364/431 |
| 4,590,563 A | | 5/1986 | Matsumura et al. ... 364/431.11 |
| 5,162,999 A | | 11/1992 | Wild et al. ............. 364/431.11 |
| 5,430,642 A | * | 7/1995 | Nakajima et al. ............. 700/50 |
| 5,541,832 A | * | 7/1996 | Nakajima et al. ............. 700/28 |

FOREIGN PATENT DOCUMENTS

| | | |
|---|---|---|
| DE | 3238153 | 4/1983 |
| DE | 4004516 | 8/1991 |
| EP | 0360528 | 3/1990 |

* cited by examiner

*Primary Examiner*—Kevin J. Teska
*Assistant Examiner*—T. Phan
(74) *Attorney, Agent, or Firm*—Laurence A. Greenberg; Werner H. Stemer; Ralph E. Locher

(57) ABSTRACT

A method for forming an actuating variable to be output periodically by a control unit in output periods for controlling an apparatus, in particular the ignition or fuel injection of internal combustion engines, includes reading output signals of at least two sensors into the control unit and ascertaining individual components of the actuating variable based on the output signals. The sensor output signals are read-in and the individual components are determined periodically at intervals of one read-in period or one determination period being equal to or a multiple of the output period of the actuating variable. The read-in period of a sensor output signal is dependent on a speed of variation of the sensor output signal, and in particular it increases as the maximum speed of variation of the sensor output signal decreases. The determination period of each individual component is dependent on the read-in periods of the sensor output signals involved in each individual component. The actuating variable is formed in each output period from all of the individual components with values being valid in that output period.

5 Claims, 2 Drawing Sheets

| Activities | | | Periods → | | | | | | | | | | | | | | | | | |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 |
| 2 | | 1 | a | x | x | x | x | x | x | x | x | x | x | x | x | x | x | x | x |
| 3 | | 1 | b | x | x | x | x | x | x | x | x | x | x | x | x | x | x | x | x |
| 4 | EP | 4 | c | x | | | x | | | x | | | x | | | x | | | | |
| 5 | | 4 | d | | x | | | x | | | x | | | x | | | x | | | |
| 6 | | 4 | e | | | x | | | x | | | x | | | x | | | x | | |
| 7 | | 8 | g | | | | x | | | | x | | | | x | | | | | | |
| 8 | | 1 | zw1 = f(a,b) | x | x | x | x | x | x | x | x | x | x | x | x | x | x | x | x |
| 9 | | 1 | zw2 = f(b,d) | x | x | x | x | x | x | x | x | x | x | x | x | x | x | x | x |
| 10 | KP | 2 | zw3 = f(b,e) | x | | x | | x | | x | | x | | x | | x | | | |
| 11 | | 4 | zw4 = f(a,c,d,e) | | | x | | | x | | | x | | | x | | | x | | |
| 12 | | 8 | zw5 = f(c,g) | x | | | | | | | x | | | | | | | | | |
| 13 | AP | 1 | ZW | x | x | x | x | x | x | x | x | x | x | x | x | x | x | | |
| 14 | | | Cylinder → | I | III | IV | II | I | III | IV | II | I | III | IV | II | I | III | IV | II |

ZW = zw1 + zw2 + zw3 + zw4 + zw5 a = engine room
b = cylinder-selective pressure in the air intake conduit
c = mean value of the pressure in the air intake conduit
d = engine temperature
e = aspirated air temperature
g = fuel quality
zw = partial ignition angle
ZW = total ignition angle

FIG. 2

| | | | | Periods → | | | | | | | | | | | | | | | |
|---|---|---|---|---|---|---|---|---|---|---|---|---|---|---|---|---|---|---|---|
| Activities ↓ | | | | | | | | | | | | | | | | | | | |
| 1 | 2 | 3 | 4 | 5 | 6 | 7 | 8 | 9 | 10 | 11 | 12 | 13 | 14 | 15 | 16 | 17 | 18 | 19 | 20 |
| 1 | | 1 | a | x | x | x | x | x | x | x | x | x | x | x | x | x | x | x | x |
| 2 | | 1 | b | x | x | x | x | x | x | x | x | x | x | x | x | x | x | x | x |
| 3 | EP | 4 | c | x | | | | | | | | x | | | | x | | | |
| 4 | | 4 | d | | x | | | | x | | | | x | | | | x | | |
| 5 | | 4 | e | | | x | | | | x | | | | x | | | | x | |
| 6 | | 8 | g | | | | x | | | | x | | | | x | | | | x |
| 7 | | 1 | zw1 = f (a,b) | x | x | x | x | x | x | x | x | x | x | x | x | x | x | x | x |
| 8 | | 1 | zw2 = f (b,d) | x | x | x | | x | x | x | | x | x | x | | x | x | x | |
| 9 | KP | 2 | zw3 = f (b,e) | x | | x | x | x | | x | x | x | | x | x | x | | x | x |
| 10 | | 4 | zw4 = f (a,c,d,e) | | | | x | | | | x | | | | x | | | | x |
| 11 | | 8 | zw5 = f (c,g) | | x | | | | | | | | | | | x | | | |
| 12 | AP | 1 | ZW | x | x | x | x | x | x | x | x | x | x | x | x | x | x | x | x |
| 13 | | | Cylinder → | I | III | IV | II | I | III | IV | II | I | III | IV | II | I | III | IV | II |

ZW = zw1 + zw2 + zw3 + zw4 + zw5 a = engine room
b = cylinder-selective pressure in the air intake conduit
c = mean value of the pressure in the air intake conduit
d = engine temperature
e = aspirated air temperature
g = fuel quality
zw = partial ignition angle
ZW = total ignition angle

METHOD FOR FORMING AN ACTUATING VARIABLE

BACKGROUND OF THE INVENTION

Field of the Invention

The invention relates to a method for forming an actuating variable to be produced periodic ally by a control unit in output periods for controlling an apparatus, in particular the ignition or fuel injection of internal combustion engines, in which output signals of at least two sensors are read into the control unit and based thereon individual components of the actuating variable are ascertained. Such a method is known from German Puiblished, Non-Prosecuted Application DE 40 04 516 A1.

In electronic engine control units for internal combustion engines, the actuating variables that are output, for example for the ignition angle or for the fuel injection quantity, are obtained from a plurality of individual components, which are calculated for measured values being furnished by various sensors, or are read out of memories associated with the measured values. Such calculation or readout processes are referred to below as "determinations".

In the case of the ignition, for instance, the engine rpm, the Pressure in the air intake conduit (separately for each cylinder and as a mean value for all of theucylinders, over two crankshaft rotations or a multiple thereof), the temperatures of the aspirated air and coolant or motor oil, the fuel quality, and the particular operating state of the engine, among other measured values, are utilized for such determinations.

The determination of the ignition angle, for instance, must meet the real-time requirements of the engine. In other words, the calculation of each ignition angle of all of the cylinders should include the current measured values. Since they are in fact analog values, they must be converted into digital variables before being read into the engine control unit.

The required sensor output signals must be read in and digitized each time between two ignitions in successive cylinders, or in other words during a one-half crankshaft rotation for a four-cylinder motor and a quarter rotation of the crankshaft for an eight-cylinder motor, each corresponding to one output period of the actuating variables or controlled variables, and in accordance with those measured values the individual components are determined (calculated or read out of a stored performance graph or table) and linked with the actuating variables.

In high-priced engines with many cylinders and microproces-sor-controlled control units having a number of sensors and calculation operations, the output period of the actuating variables is shorter at high engine rpm than the requisite determination time for the variables. The result is that the ignition angles, for instance, remain constant over a plurality of output periods or a plurality of ignitions, until a new value is present. In the high rpm range and in the case of simultaneous load dynamics (rapid surges of gas), that method causes engine-incompatible operating states, such as engine knocking, because the ignition timing is not current. In the control unit of German Published, Non-Prosecuted Application DE 40 04 516 A1, the intent is to solve the problem by providing additional microprocessors (controllers), which are supposed to process the read-in measured values parallel and independently of one another in different planes and with different priorities. Therefore a corresponding powerful processor-communications interface is needed. Such a construction is expensive and requires major effort and expense for hardware and software. It intrinsically involves a correspondingly high number of possible sources of error.

SUMMARY OF THE INVENTION

It is accordingly an object of the invention to provide a method for forming an actuating variable, which overcomes the hereinafore-mentioned disadvantages of the heretofore-known methods of this general type, which makes do without additional hardware expense as compared with known embodiments and which nevertheless makes more-current actuating variables available for each output period in the high-rpm range.

With the foregoing and other objects in view there is provided, in accordance with the invention, in a method for forming an actuating variable to be output periodically by a control unit in output periods for controlling an apparatus, in particular the ignition or fuel injection of internal combustion engines, which includes reading output signals of at least two sensors into the control unit and ascertaining individual components of the actuating variable based on the output signals, the improvement which comprises reading in the sensor output signals and determining the individual components periodically at intervals of one read-in period or one determination period being equal to or a multiple of the output period of the actuating variable; adjusting the read-in period of a sensor output signal to be dependent on a speed of variation of the sensor output signal, and in particular increasing the read-in period of the sensor output signal as the maximum speed of variation of the sensor output signal decreases; adjusting the determination period of each individual component to be dependent on the read-in periods of the sensor output signals involved in each individual component; and forming the actuating variable in each output period from all of the individual components with values being valid in that output period.

Accordingly, reading in of the sensor output signals is carried out as a function of their maximum variation speed, at different periodic intervals. At high rpm, for instance, signals which are read into the control unit are as follows:

"engine rpm" and "pressure in air intake conduit" (in a time slot of the aspiration stroke of each cylinder), which can vary quite quickly in every period;

"engine temperature" and "aspirated air temperature", which do not vary as fast, after every other or every fourth period; and "fuel quality", which varies substantially at most after a gas tank filling operation, only after every eighth (or even more) period.

Furthermore, individual components, which are determined by using sensor output signals with a high maximum variation speed and which contribute substantially to forming the actuating variables, are determined at correspondingly shorter intervals (periods) than individual components which are determined by using sensor output signals with a lesser maximum variation speed and which accordingly undergo no variations or no serious variations (within the range of approximately 8 or 16 crankshaft rotations) or only slightly contribute to the value of the actuating variable.

In accordance with a concomitant mode of the invention, the read-in and determination periods, or their intervals, are dependent on the engine rpm.

In each output period, or accordingly during each half crankshaft revolution (180° KW) for ignition systems of four-cylinder engines, a total ignition angle is formed from the individual components which are present (partial ignition angle amounts) and output.

In this way, with the same hardware expense, considerable savings of effort for reading, digitizing and computation can be attained, even though the actuating variables that are determined can be adapted substantially better to given operating conditions than in the case of known control units, because an updated actuating variable is available in every output period, or in other words for every ignition, even in the high-rpm range.

Other features which are considered as characteristic for the invention are set forth in the appended claims.

Although the invention is illustrated and described herein as embodied in a method for forming an actuating variable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a table showing activities of associated lines 2–13 and output periods of associated columns 5–20, with activities that are carried out in an output period being marked

DESCRIPTION OF THE PREFERRED EMBODIMENTS

Figure 1:
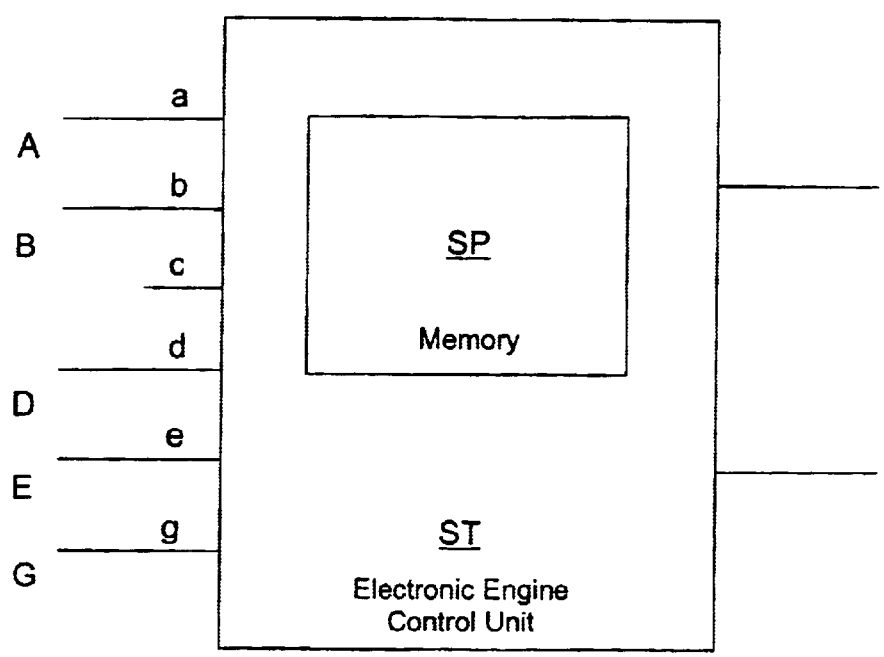
FIG. 1 is a block circuit diagram of an electronic engine control unit for a motor vehicle.

Referring now to the figures of the drawing in detail and first, particularly, to FIG. 1 thereof, there is seen a block circuit diagram of an electronic engine control unit ST for a non-illustrated internal combustion engine for a motor vehicle. Output signals a-e and g of sensors A, B, D, E and G are supplied to this microprocessor-controlled control unit, which determines partial ignition angles zw1–zw5 from them and from other non-illustrated input signals, or in other words calculates them or reads them out of a memory SP that is integrated with the control unit ST and forms actuating variables from them, in this case ignition angles ZW and fuel injection durations (=quantities) ED for controlling the engine.

In the case of such a control unit, taking the determination of the ignition angles ZW for a non-illustrated four-cylinder engine in the high-rpm range of a motor vehicle as an example, FIG. 2 shows a table with 14 lines and 20 columns, in which the lines are numbered in column 1 and the columns are numbered in line 1. The lines which are are abbreviated as "L" and the columns as "Col" below indicate the following:

L2–L7: read-in periods EP of the sensor output signals a, b, c, d, e and g;
L8–L12: determination periods KP of the individual components zw1–zw5;
L13: output periods AP for the ignition angles ZW; and
L14: various cylinders in which these ignition angles trip an ignition spark.

These are all marked with an "x" as applicable. The cylinders are numbered sequentially in line 14, beginning with column 5, in an ignition order I-III-IV-II. In this diagrammatic exemplary embodiment, the sensor output signals or the values derived from them (lines 2–7; column 4) are associated with the following:

a: engine rpm;
b: cylinder-selective pressure in the air intake conduit;
c: mean value of the pressure in the air intake conduit;
d: engine temperature;
e: aspirated air temperature; and
g: fuel quality.

The five individual components zw1–zw5 (partial ignition angles which link together to produce the total ignition angle ZW, seen in column 4, lines 8–13) are determined as follows from the following signals:

zw1: from the sensor output signals a and b;
zw2: from the sensor output signals b and d;
zw3: from the sensor output signals b and e;
zw4: from the sensor output signals a, c, d and e; and
zw5: from the sensor output signals c and g.

As is indicated in FIG. 2, column 4, the individual components, in this case the partial ignition angles, are quite generally a function of the sensor output signals required for determination of them:

zw1=f(a, b), etc. up to zw5=f(c, g).

The sensor output signals a (engine rpm) and b (cylinder-selective pressure in the aspiration conduit), lines 2 and 3, are the signals that vary the quickest. They are therefore read into the control unit ST and digitized if they are in analog form, every 180° KW, or in other words in every output period (marked "x" in columns 5–20).

The signal c, as a mean value of the signals b, and the signals d, e and g, vary substantially more slowly. Although the mean value of the pressure (signal c) is calculated from the signals b in the control unit ST, nevertheless in this exemplary embodiment, for the sake of simplicity, it will be called the output signal and handled in that way.

In column 3, the period intervals, in which the sensor output signals a, b, d, e and g or c are calculated and the determinations of the partial ignition angles zw1–zw5 and the formation of the total ignition angle ZW are carried out, are indicated in out periods of 180° KW each. The numeral "1" in column 3 accordingly means "after each one-half crankshaft rotation"; the numeral "2" means "after every crankshaft rotation"; the numeral "4" means "after every other crankshaft rotation"; the numeral "8" means "after every fourth crankshaft rotation", and so forth.

These periods can be seen in columns 5–20 for the various signals. These columns also indicate the distribution of the various activities, which is done in such a way that the control unit has the most uniform possible "amount of work" to perform in the various output periods.

The determination of the partial ignition angles and the forming of the total ignition angles is done in the periods indicated by using the most recently determined sensor output signals and partial ignition angles.

For instance, the total ignition angle ZW, which in this exemplary embodiment is formed from the sum of five partial ignition angles (ZW=zw1+zw2+zw3+zw4+zw5), is assembled in column 10 for cylinder number III from:

the partial ignition angles zw1, zw2 determined in column 10;

the partial ignition angle zw3 determined in column 9;

the partial ignition angle zw4 determined in column 8; and the partial ignition angle zw5 determined in column 6.

The lower the rpm becomes, the smaller (measured in degrees of crankshaft angle) the read-in periods EP and the determination periods KP can become, because the times which are then available become longer and longer until finally at minimal rpm all of the sensor output signals and all of the partial ignition angles as well as the total ignition angle ZW, can be read in and determined in each period (during every one-half rotation of the crankshaft).

From this it can be seen that with this method a great proportion of the processing effort which was required in known control units for determination of the ignition angles and the injection durations and other control signals that were not mentioned herein, can be saved, and nevertheless more-current control values than in known embodiments are attainable even in the high-rpm range for each period.

As a result, up to a substantially higher engine rpm, the ignition angle ZW and the ignition quantities can be determined during each one-half rotation of the crankshaft, or in other words for each cylinder. Should the time available at an even higher engine rpm no longer be adequate, then nevertheless because of the substantially shorter determination duration, values that can be better adapted to requirements than in known equipment are attainable.

The method, which has been described in conjunction with the formation of ignition angles in electronic ignition control units of motor vehicle engines in this exemplary embodiment, is likewise quite generally applicable to all electronic control units that must struggle with time problems in the periodic determination of actuating variables from a number of input signals having different maximum variation speeds.

What is claimed is:

1. In a method for forming an actuating variable to be output periodically by a control unit in output periods for controlling an apparatus, which includes reading output signals of at least two sensors into the control unit and ascertaining individual components of the actuating variable based on the output signals, the improvement which comprises:

reading in the sensor output signals and determining the individual components periodically at intervals of one read-in period or one determination period being equal to or a multiple of the output period of the actuating variable;

adjusting the read-in period of a sensor output-signal to be dependent on a speed of variation of the sensor output signal;

adjusting the determination period of each individual component to be dependent on the read-in periods of the sensor output signals involved in each individual component; and forming the actuating variable in each output period from all of the individual components with values being valid in that output period.

2. The method according to claim 1, which comprises increasing the read-in period of the sensor output signal as the maximum speed of variation of the sensor output signal decreases.

3. The method according to claim 1, which comprises varying the size of the read-in periods of the sensor output signals and the size of the determination periods of the individual components as a function of an operating parameter of the apparatus to be controlled.

4. The method according to claim 2, which comprises selecting engine rpm as an operating parameter of the apparatus to be controlled.

5. In a method for forming an actuating variable to be output periodically by a control unit in output periods for controlling the ignition or fuel injection of internal combustion engines, which includes reading output signals of at least two sensors into the control unit and ascertaining individual components of the actuating variable based on the output signals, the improvement which comprises:

reading in the sensor output signals and determining the individual components periodically at intervals of one read-in period or one determination period being equal to or a multiple of the output period of the actuating variable;

adjusting the read-in period of a sensor output signal to be dependent on a speed of variation of the sensor output signal;

adjusting the determination period of each individual component to be dependent on the read-in periods of the sensor output signals involved in each individual component; and forming the actuating variable in each output period from all of the individual components with values being valid in that output period.

* * * * *